United States Patent
Scipione

(10) Patent No.: US 12,506,437 B2
(45) Date of Patent: Dec. 23, 2025

(54) SOLAR ARRAY MOUNTING SYSTEM WITH RAINWATER MANAGEMENT

(71) Applicant: Donald S. Scipione, Cleveland Heights, OH (US)

(72) Inventor: Donald S. Scipione, Cleveland Heights, OH (US)

(*) Notice: Subject to any disclaimer, the term of this patent is extended or adjusted under 35 U.S.C. 154(b) by 0 days.

(21) Appl. No.: 18/798,739

(22) Filed: Aug. 8, 2024

(65) Prior Publication Data

US 2025/0055413 A1    Feb. 13, 2025

Related U.S. Application Data

(60) Provisional application No. 63/518,397, filed on Aug. 9, 2023.

(51) Int. Cl.
*H02S 40/00* (2014.01)
*E03B 3/02* (2006.01)
*H02S 20/20* (2014.01)

(52) U.S. Cl.
CPC ............... *H02S 40/00* (2013.01); *E03B 3/02* (2013.01); *H02S 20/20* (2014.12)

(58) Field of Classification Search
None
See application file for complete search history.

(56) References Cited

U.S. PATENT DOCUMENTS

| | | | | |
|---|---|---|---|---|
| 6,870,087 B1* | 3/2005 | Gallagher | ......... | H01L 31/02008 136/246 |
| 9,249,925 B2 | 2/2016 | Roensch et al. | | |
| 9,605,397 B1* | 3/2017 | Cherrier | ................ | E02B 11/005 |
| 2011/0303262 A1* | 12/2011 | Wolter | ..................... | F24S 25/11 136/251 |
| 2014/0190096 A1* | 7/2014 | Kacandes | ............... | H10F 71/00 52/173.3 |
| 2020/0321905 A1* | 10/2020 | Scipione | ................. | H02S 20/23 |
| 2024/0273583 A1* | 8/2024 | Tilley | .................... | E04H 1/1205 |

FOREIGN PATENT DOCUMENTS

| CA | 2851936 C | 3/2017 | | |
|---|---|---|---|---|
| EP | 2034249 A1 * | 3/2009 | ............... | F24J 2/045 |

OTHER PUBLICATIONS

Machine translation of EP2034249A1 (Year: 2009).*
RM10 Installation Guide; Published Jan. 11, 2022.

* cited by examiner

*Primary Examiner* — Ryan S Cannon
(74) *Attorney, Agent, or Firm* — Renner, Otto, Boisselle & Sklar, LLP

(57) ABSTRACT

A method of assembling a solar array includes: roll-forming a first length of gutter material into a first gutter channel; roll-forming a second length of gutter material into a second gutter channel; arranging a solar panel between the first gutter channel and the second gutter channel; connecting a first bracket assembly to the solar panel and to a first gutter channel short side; connecting a second bracket assembly to the solar panel and to a second gutter channel long side; downwardly sloping the solar panel in a solar panel slope direction; downwardly sloping the first gutter channel along the first gutter channel longitudinal length in a chosen direction; and downwardly sloping the second gutter channel along the second gutter channel longitudinal length in the chosen direction.

9 Claims, 17 Drawing Sheets

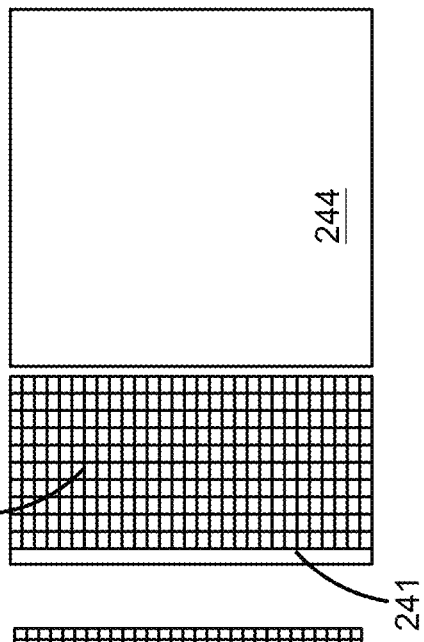
Fig. 4C
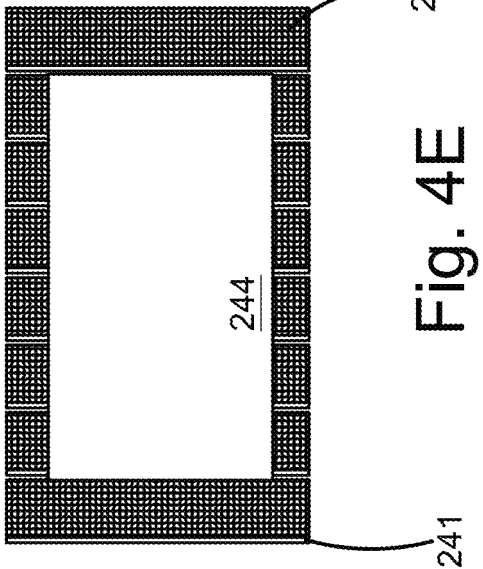
Fig. 4E
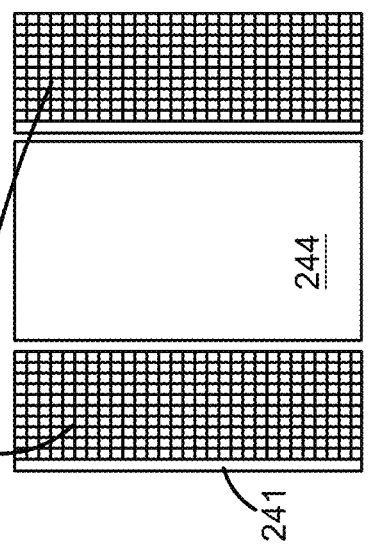
Fig. 4B
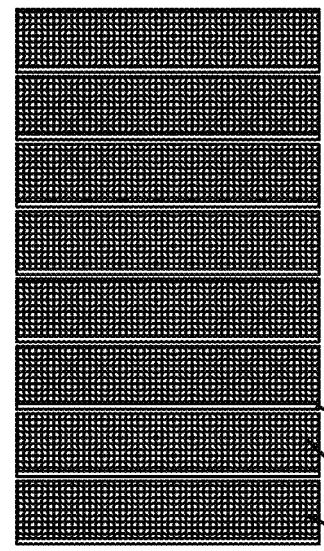
Fig. 4D
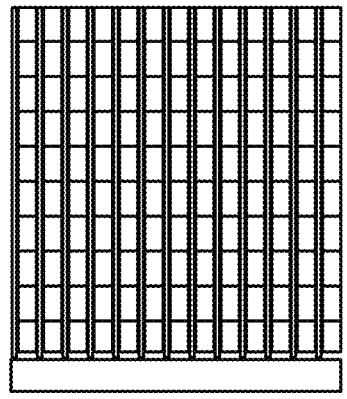
Fig. 4A
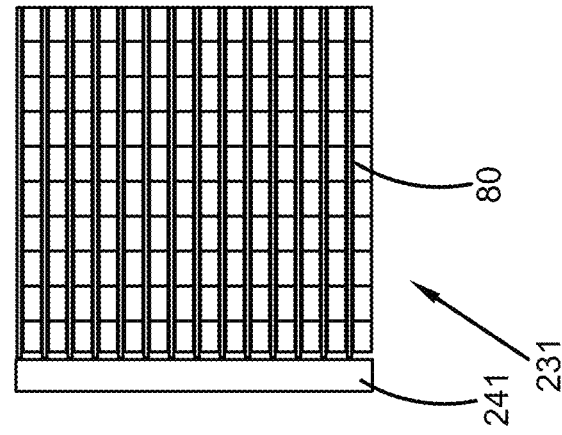

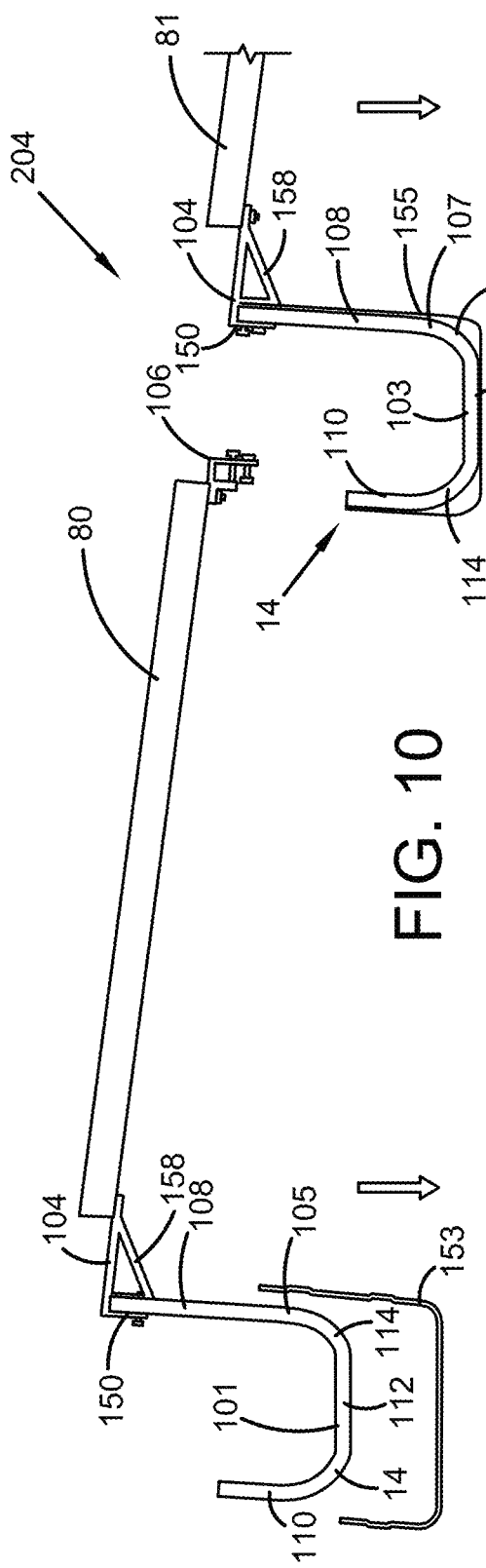
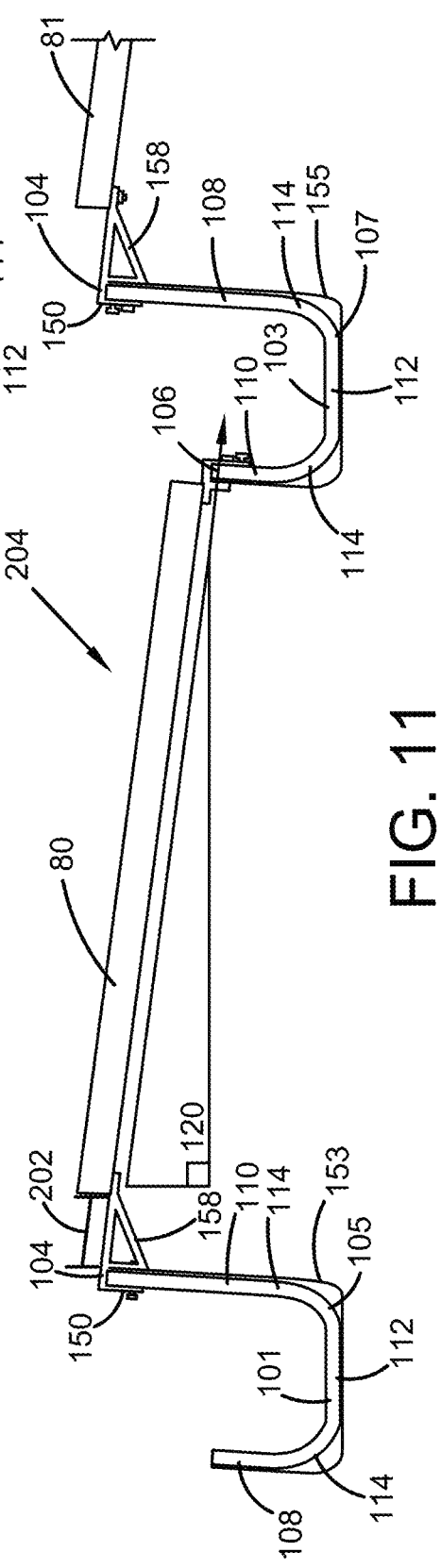

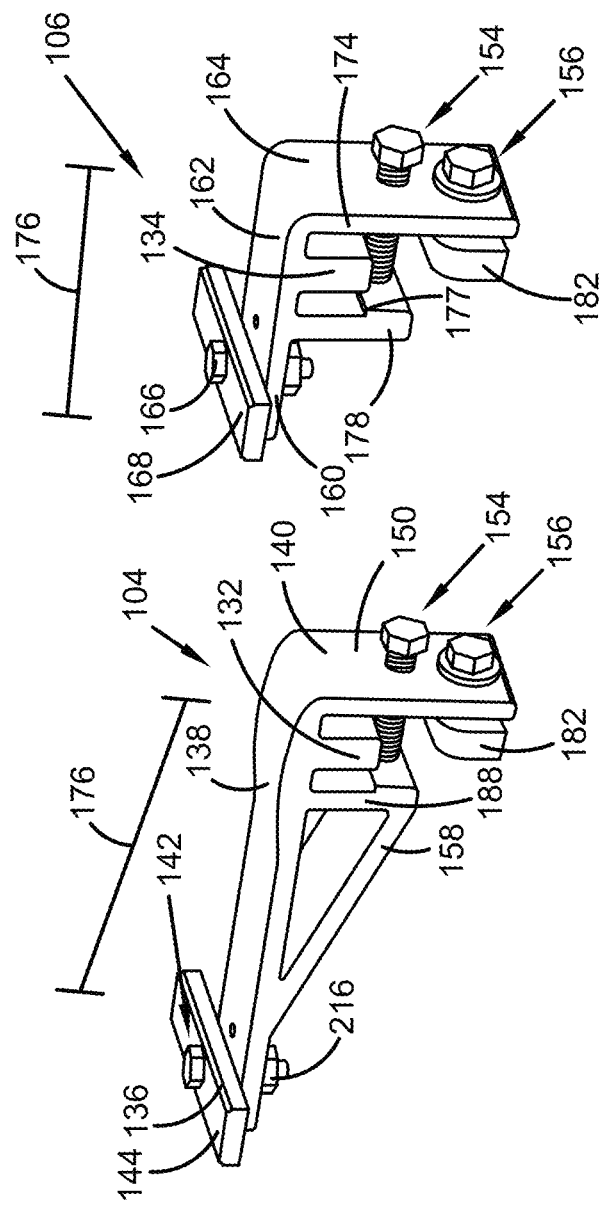

SOLAR ARRAY MOUNTING SYSTEM WITH RAINWATER MANAGEMENT

FIELD OF THE INVENTION

The present invention relates generally to the field of solar panel mounting systems, and more particularly to solar array mounting systems.

BACKGROUND

In some typical ground-mounted solar installations, rows of solar panels are strategically spaced to facilitate the growth of vegetation between them. This design is crucial because it helps to prevent soil erosion, which can be exacerbated by rainwater cascading off the panels. Additionally, climate change has led to increased precipitation in some areas, intensifying the risk of erosion and making the strategic spacing even more essential. Consequently, this necessary spacing means that such solar systems require a considerable amount of land. The panels cannot be placed too closely together without compromising the ecological stability of the terrain beneath them. This approach, while beneficial for preventing erosion, results in a relatively inefficient use of land, as the area needed to deploy a significant amount of solar capacity becomes quite large.

SUMMARY

The present disclosure provides a system and method for mounting a solar panel array with rainwater management. The present disclosure also provides a bracket assembly for coupling a solar panel to a gutter channel, and a gutter assembly for mounting a solar array, including one or more bracket assemblies coupled with a gutter channel. The bracket assembly includes a bracket having a U-shape with a long side and a short side, corresponding to the internal U-shape of the gutter channel, which similarly has a long side and a short side. When the bracket assemblies couple a solar panel with gutter channels, the solar panel is coupled with a long side of one gutter channel and the long sides of a set of one or more brackets. The other side of the solar panel is coupled with a short side of a second gutter channel and short sides of another set of one or more brackets. After mounting the solar array using the gutter assemblies, the solar panels of the array are angled at a downward slope, allowing for rainwater to be directed downwardly into a gutter channel.

Using the method, mounting system, and bracket assemblies, one or multiple solar panels can be flexibly arranged into solar panel arrays of different shapes and dimensions. The flexibility of the arrangement of the solar panels allows for solar arrays to be tailored to small or uniquely shaped areas of land, including areas of land near bodies of water, crops, or other areas near which rainwater management would be desirable. The gutter channels can be formed onsite, such as with Roll-A-Rack™ portable roll forming technology, so that the gutter channels can be provided as needed. The ability to cut the gutter channels to a chosen length further permits flexibility in designing the configurations of the solar arrays.

More specifically, the present disclosure provides that a method of assembling a solar array includes: roll-forming a first length of gutter material into a first gutter channel; roll-forming a second length of gutter material into a second gutter channel; arranging a solar panel between the first gutter channel and the second gutter channel; connecting a first bracket assembly to the solar panel and to a first gutter channel short side; connecting a second bracket assembly to the solar panel and to a second gutter channel long side; downwardly sloping the solar panel in a solar panel slope direction; downwardly sloping the first gutter channel along the first gutter channel longitudinal length in a chosen direction; and downwardly sloping the second gutter channel along the second gutter channel longitudinal length in the chosen direction.

The present disclosure also provides that a bracket assembly for coupling a solar panel array to a gutter channel includes a bracket, an extended clamp, and a compact clamp. The bracket has a long bracket arm and a short bracket arm, the long bracket arm being longer than the short bracket arm. Each of the long bracket arm and the short bracket arm extend from a bottom bracket portion of the bracket. The extended clamp is connectable to the long bracket arm, a first solar panel of the solar panel array, and the gutter channel. The gutter channel has a long gutter channel wall which is longer relative to a short gutter channel wall, each of the long gutter wall and short gutter wall extending from a gutter channel base wall. The compact clamp is connectable to the short bracket arm, a second solar panel of the solar panel array, and the gutter channel.

A method of assembling a solar array includes: roll-forming a first length of gutter material into a first gutter channel such that the first gutter channel has a first gutter channel long side, a first gutter channel short side, and a first gutter channel longitudinal length, the first gutter channel long side being longer than the first gutter channel short side; roll-forming a second length of gutter material into a second gutter channel such that the second gutter channel has a second gutter channel long side, a second gutter channel short side, and a second gutter channel longitudinal length, the second gutter channel long side being longer than the second gutter channel short side; arranging a solar panel between the first gutter channel and the second gutter channel; connecting a first bracket assembly to the solar panel and to the first gutter channel short side; connecting a second bracket assembly to the solar panel and to the second gutter channel long side; downwardly sloping the solar panel in a solar panel slope direction; downwardly sloping the first gutter channel along the first gutter channel longitudinal length in a chosen direction; and downwardly sloping the second gutter channel along the second gutter channel longitudinal length in the chosen direction.

The method may include downwardly sloping the solar panels, the first gutter channel, and/or the second gutter channel toward a bioswale.

The method may include downwardly sloping the solar panels, the first gutter channel, and/or the second gutter channel toward a pollinator habitat.

The method may include downwardly sloping the solar panels, the first gutter channel, and/or the second gutter channel toward a body of water.

The method may include connecting two or more solar panels in a row in series to produce a block of panels.

The method may include coupling two or more blocks of panels.

The method may include connecting ten solar panels in a row in series to produce a block of ten panels.

The method may include coupling two or more blocks of panels.

The method may include substantially perpendicularly connecting an additional gutter channel to one or more ends of the one or more gutter channels; wherein the additional gutter channel is configured to direct rainfall in a direction substantially perpendicular to the chosen direction.

A system for coupling a solar panel array to a gutter channel includes: one or more brackets configured to fit within one or more gutter channels; one or more extended clamps configured to couple respective long arms of the one or more brackets with one or more rows of solar panels; and one or more compact clamps configured to couple respective short arm of the one or more brackets with the one or more rows of solar panels, the respective long arms of the one or more brackets being longer than the respective short arms of the one or more brackets.

The one or more gutter channels and the one or more rows of solar panels may be configured to be downwardly sloped in a chosen direction.

A bioswale may be located downstream in the chosen direction.

The bioswale may further include a pollinator habitat.

Each of the one or more rows of solar panels may include ten solar panels.

A bracket assembly for coupling a solar panel array to a gutter channel includes: a bracket having a long bracket arm and a short bracket arm, the long bracket arm being longer than the short bracket arm; and each of the long bracket arm and the short bracket arm extending from a bottom bracket portion; an extended clamp configured to connect to the long bracket arm, a first solar panel of the solar panel array, and the gutter channel having a long gutter channel wall relative to a short gutter channel wall, each of the long gutter wall and short gutter wall extending from a gutter channel base wall; and a compact clamp configured to connect to the short bracket arm, a second solar panel of the solar panel array, and the gutter channel.

The extended clamp may include: an extended clamp front region configured to connect to the first solar panel; an extended clamp back region configured to connect to the long bracket arm; and an extended clamp intermediate region configured to connect to the long gutter channel wall.

The compact clamp may include: a compact clamp front region configured to connect to the second solar panel; a compact clamp back region configured to connect to the short bracket arm; and a compact clamp intermediate region configured to connect to the short gutter channel wall.

The bracket may include a hollow region defined by a back bracket wall and two bracket side walls extending from a bracket back edge.

The extended clamp intermediate region may include an extended clamp central leg configured to fit within in an end portion of the hollow region in the long bracket arm; and the compact clamp intermediate region may include compact clamp central leg configured to fit within an end portion of the hollow region in the short bracket arm.

The extended clamp front region may include a front clamp plate configured to connect to a first short flange of the first solar panel; and the compact clamp front region may include a back clamp plate configured to connect to a second short flange of the second solar panel.

The extended clamp intermediate region may include an extended clamp front leg; the extended clamp front leg and the extended clamp central leg may define a first gutter-accepting region configured to accept at least a portion of the long gutter channel wall; the compact clamp intermediate region may include a compact clamp front leg; and the compact clamp front leg and the compact clamp central leg may define a second gutter-accepting region configured to accept at least a portion of the short gutter channel wall.

A difference in length between the long gutter wall and the short gutter wall may be configured to secure the solar panel array in a sloped position.

The extended clamp may include an extended clamp dimension extending between the extended clamp front region and the extended clamp back region; the compact clamp may include a compact clamp dimension extending between the compact clamp front region and the compact clamp back region; and the extended clamp dimension may be larger than the compact clamp dimension.

The extended clamp may include a reinforcing arm along the extended clamp dimension between the extended clamp front region and the extended clamp intermediate region.

The bracket assembly may include: a first bolt configured to secure the long gutter wall against the first front leg via a slot in the bracket; and a compact clamp bolt configured to secure the short gutter wall against the second front leg via the slot in the bracket.

The first bolt may be configured not to contact the extended clamp central leg while securing the long gutter wall against the first front leg; and the compact clamp bolt may be configured not to contact the compact clamp central leg while securing the short gutter wall against the second front leg.

The gutter channel may be configured to be downwardly sloped.

A first gap between the first solar panel and the long gutter wall may be larger than a second gap between the second solar panel and the short gutter wall.

A gutter assembly for mounting a solar panel array includes: a gutter channel; and one or more bracket assemblies, each of the bracket assemblies including:

a bracket having a long bracket arm and a short bracket arm, the long bracket arm being longer than the short bracket arm; and one or both of an extended clamp or a compact clamp. The extended clamp is connected to the long bracket arm, a first solar panel of the solar panel array, and the gutter channel having a long gutter channel wall relative to a short gutter channel wall, each of the long gutter wall and short gutter wall extending from a gutter channel base wall; the compact clamp is connected to the short bracket arm, a second solar panel of the solar panel array, and the gutter channel; the one or more bracket assemblies fit respectively within the gutter channel; and the extended clamp and the compact clamp of each of the one or more bracket assemblies connect respectively to the gutter channel.

The gutter assembly may secure the solar panel array into a rectangular configuration or a non-rectangular configuration.

The gutter assembly may function as an electrical ground.

The gutter assembly may cover at least a portion of a substructure of the solar array.

The gutter assembly may support one or more rows of solar panels, each solar panel within each of the one or more rows of solar panels being electrically connected in series.

The gutter assembly may include two or more rows of solar panel, each of the two or more rows of solar panels being electrically connected in parallel.

A ground installable solar panel system may include one or more rows of solar panels; and one or more gutter channels respectively associated with each of the one or more rows of solar panels, at least some of the one or more gutter channels are disposed between the one or more rows of solar panels. Each of the one or more rows of solar panels may be configured to direct rainwater into the respective one or more gutter channels; and the one or more gutter channels may be configured to direct the rainwater away from the solar panel system into a bioswale, body of water, or storage container.

Each of the one or more rows of solar panels may be downwardly sloped.

Each of the one or more gutter channels may be downwardly sloped.

The solar panel system may include a bioswale, and the one or more gutter channels may direct the rainwater into the bioswale.

The one or more rows of solar panels may each include ten solar panels.

The gutter channels may be roll-formed.

Each of the one or more rows of solar panels may include two or more solar panels electrically connected in series.

Each of the one or more rows of solar panels may be electrically connected in parallel.

The solar panel system may act as an electrical ground.

The solar panel system may be installed on an impregnable surface.

The impregnable surface may be a parking lot.

The one or more rows of solar panels may be arranged in an array.

The array may be rectangularly shaped or non-rectangularly shaped.

The array may be asymmetrical.

The array may be symmetrical.

The one or more rows of solar panels within the array may be spaced apart from each other at a distance of one foot or less.

The foregoing and other features of the bracket assembly and gutter assembly are hereinafter fully described and particularly pointed out in the claims, the following description and the annexed drawings setting forth in detail one or more illustrative embodiments of the invention. These embodiments, however, are but a few of the various ways in which the principles of the invention can be employed. Other objects, advantages, and features of the invention will become apparent from the following detailed description of the invention when considered in conjunction with the drawings.

BRIEF DESCRIPTION OF THE DRAWINGS

FIG. 4a is a top plan view of a solar array directing water into a bioswale area using a mounting system.

FIG. 4b is a top plan view of two solar arrays, mounted with a crop area therebetween using the mounting system, in which the two solar arrays and mounting system are directing water into respective bioswale areas.

FIG. 4c is a top plan view of a solar array directing water toward a bioswale and away from a crop area using the mounting system FIG. 4d is a top plan view of multiple solar arrays directing water toward respective bioswales using the mounting system.

FIG. 4e is a top plan view of multiple solar arrays directing water toward respective bioswales using the mounting system, the solar arrays completely surrounding a crop area.

FIG. 5b is a top plan view of the solar array of FIG. 5a.

FIG. 6b is a top plan view of the row of solar panels of FIG. 6a.

FIG. 10 is a front view of a partially mounted solar array.

FIG. 11 is a front view of a mounted solar array.

FIG. 15 is a front perspective view of an extended clamp of the bracket assembly.

FIG. 16 is a front perspective view of a compact clamp of the bracket assembly.

DETAILED DESCRIPTION

Figure 1:
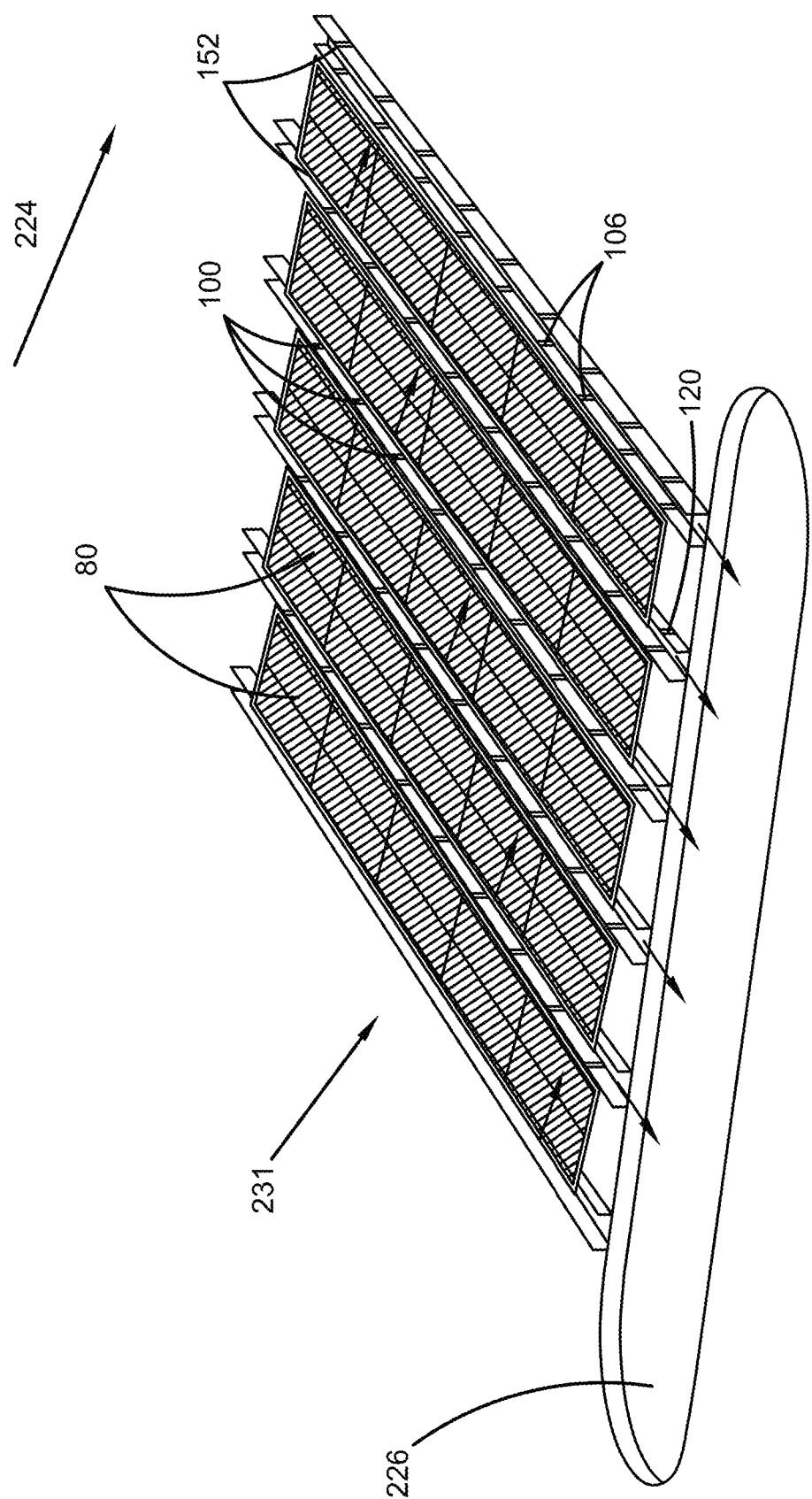
FIG. 1 is a top right perspective view of a solar panel array mounted upon multiple gutter channels using bracket assemblies.

A solar array assembled using the mounting system of the present disclosure can incorporate the ability to collect and manage precipitation falling onto solar arrays. For example, a solar array assembled with the mounting system of the present disclosure can provide for rainwater management when the solar array is located on an impregnable surface such as a flat commercial building rooftop, an abandoned parking lot, or a covered parking structure. Other impregnable surfaces may include surfaces made of concrete, steel, stone, rugged terrain, or other surfaces that are difficult to penetrate.

A ground-based solar array that is assembled using the mounting system of the present disclosure can be used to direct precipitation from the solar array to an adjoining bioswale. A bioswale is a landscape feature which manages stormwater by filtering the stormwater through vegetation and soil. A bioswale can include a shallow trench filled with vegetation, compost, or other organic materials that help slow down and capture rainwater. This capturing of rainwater can allow for the removal of pollutants and sediment from the water, thereby improving the quality of the water before it enters larger bodies of water, such as lakes or rivers. A solar array that is built using the mounting system of the present application can be used in an urban area because of its ability to be arranged in a small or uniquely shaped area. Therefore, the solar panels can be used alongside urban bioswales, which can reduce the burden on traditional sewer systems and mitigate flood risks.

The bioswale may incorporate a pollinator habitat. Pollinator habitats may facilitate fertilization of flowering plants by promoting the health and well-being of pollinators such as bees, butterflies, birds, bats, and beetles. Accordingly, a solar array built using the present mounting system can direct water to flowering plants in the pollinator habitat, encouraging growth of the plants. Therefore, unlike traditional solar arrays, the solar array of the present application can encourage health of the ecosystem.

The ground-based solar array that is assembled using the mounting system of the present disclosure may also be used to direct precipitation from the solar array into an adjoining storage tank. The storage tank, for example, may be a pipe with a top portion removed, an open top tank, an aluminum gutter, or any other suitable container.

The mounting system and method is flexible to the requirements of relatively small spaces, or places in which space for solar arrays is at a premium, is contentious, or is otherwise limited, as the footprint can be much smaller than the footprint of traditional solar arrays. The mounting system can provide for multiple rows of solar panels with gutter channels therebetween. The number of solar panels in each row can vary, as well as the lengths of the individual gutter channels. The solar panels and gutter channels can be selectively sloped such that precipitation is directed in a chosen direction. The chosen direction can be in the direction of a bioswale, a pollinator habitat, a body of water, or in any other suitable chosen direction based on the location of installation of the solar array.

Turning now to the drawings, FIG. 1 illustrates a solar array (or "array") 231 mounted with a mounting system, the mounting system including gutter channels 152 and bracket assemblies. In the array 231, solar panels 80 are coupled to gutter channels 152 so that water is directed toward the gutter channels 152 corresponding to each row of panels 80. The gutter channels 152 are then sloped downwardly in a flow direction 224 so that rainwater collected within the gutters 152 flows in the direction 224 toward a body of water 226 or water collection region. The water can be directed toward a body of water 226, toward crops, toward a bioswale region, toward a water collection device, or toward any other chosen landscape feature, device, or destination.

Figure 3:
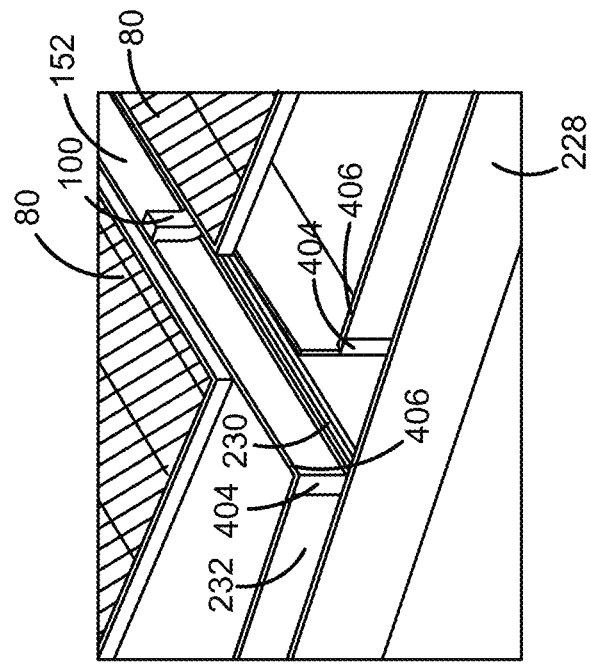
FIG. 3 is a top right perspective view of a connection location between a gutter channel attached to solar panels 80 and the additional gutter channel of FIG. 2.
Figure 2:
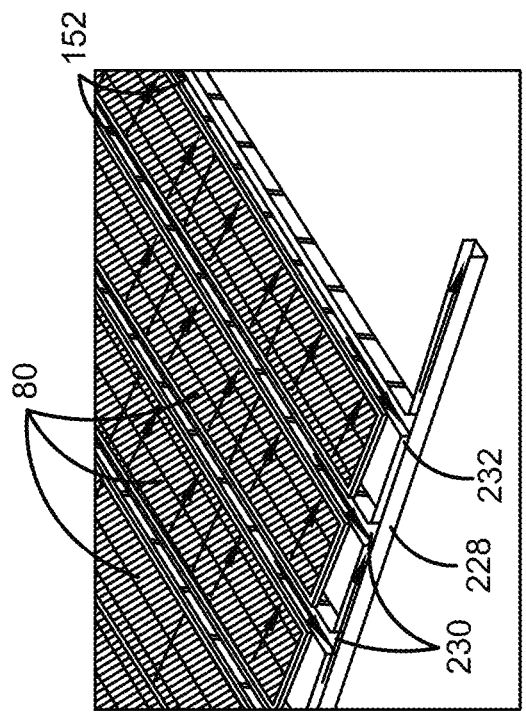
FIG. 2 is a top right perspective view of a solar array mounted using multiple of the bracket assemblies and an additional gutter channel along a side of the solar array.

An additional gutter channel 228 can be coupled to one or more ends of the gutter channels 152, as shown in FIGS. 2 and 3. The additional gutter channel 228 can have openings 230 in its side wall 232 at locations corresponding to the locations of the gutter channels 152 along the solar array. At the openings 230, there can be connection points 404 at transition regions 406 between the gutter channels 152 and the additional gutter channel 228. The connection points 404 can seal the transition regions 406 between the interior of the gutter channels 152 and the interior of the additional gutter channel 228, preventing rainwater from leaking out at the transition regions 406. The gutter channels 152 and the additional gutter channel 228 facilitate flexible solar array configurations.

The chosen configuration of the solar panel array can be a rectangular configuration. The chosen configuration can also be any other configuration suited to the location of the installation of the array and the rainwater management requirements of that location. For example, a chosen configuration could resemble the configuration of any of the arrays 231 illustrated in FIGS. 4a-4e. The chosen configuration can be specifically selected for the specific area on which the array 231 is to be placed.

For example, in FIG. 4a, the panels 80 in the array 231 are arranged to direct rainwater into a bioswale 241 on one side of the array 231. In FIG. 4b, an opening 244 is between two arrays 231, with each of the arrays 231 arranged to direct rainwater toward respective bioswales 241. In FIG. 4c, an array 231 is arranged to direct rainwater away from an opening 244 and into a bioswale 241. In FIG. 4d, multiple arrays 231 are tightly arranged near each other, each directing rainwater into its respective bioswale 241. In FIG. 4e, the arrays 231 surround an opening 244 while each directing rainwater into respective bioswales 241 surrounding the opening 244. The opening 244 may be an area where a body of water or a crop area is located with the arrays 231 surrounding the body of water or crop area. Alternatively or additionally, the opening 244 may contain any other feature or quality upon which solar panels 80 should not be installed or upon which it is desired not to install solar panels 80 or arrays 231.

Gutter assemblies including the bracket assemblies 100 (FIG. 1) and gutter channels 152 (FIG. 1) can be used to direct rainwater either inwardly into the opening 244 or outwardly away from the opening 244 and outside of the solar array 231. For example, it may be desirable to direct rain water inwardly toward the opening 244 if the opening 244 contains a crop area or a body of water. In contrast, if the opening 244 contains a building or some feature upon which the collection of rainwater would be undesirable, the rainwater can be directed away from the opening 244.

The direction of rainwater can be accomplished by using bracket assemblies and gutter channels described in further detail below. Namely, selectively coupling the solar panels 80 to first and second brackets to slope the panels 80 (FIG. 1) in a chosen direction as well as selectively sloping the gutter channels 152 (FIG. 1) in the chosen direction. Additional gutter channels 228 (FIG. 2) can be coupled to the ends of the gutter channels 152, as necessary, to direct the rainwater toward the opening 244.

Figure 5A:
FIG. 5a is a side view of a solar array sloped downwardly into a bioswale area using the mounting system.
Figure 5B:
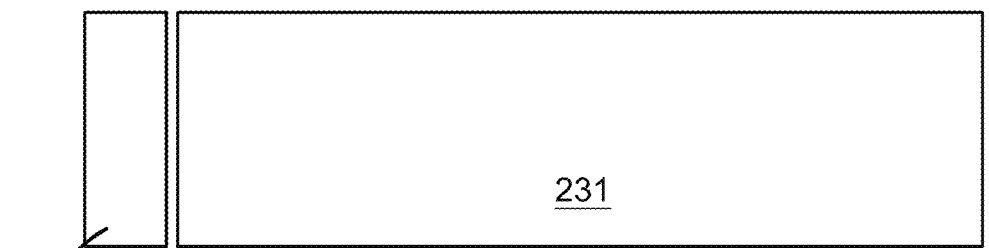
Figure 6A:
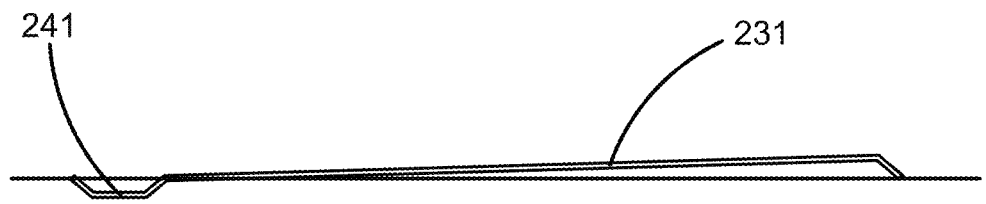
FIG. 6a is a side view of a row of ten solar panels sloped downwardly into a bioswale area using the mounting system.
Figure 6B:
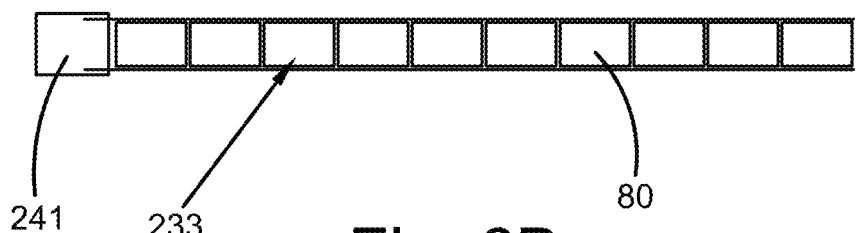

FIGS. 5a-5b illustrate the sloping of a solar array 231 into a bioswale 241. As shown, the solar array 231 is sloped downwardly in the direction of the bioswale 241. FIGS. 6a-6b illustrate the sloping of a solar array 231 of ten panels 80 downwardly toward a bioswale 241. A row of a chosen number of panels 80, such as a row of ten panels 80, for example, can be used as a base unit for building a larger solar array 231 made of multiple rows of the chosen number of panels 80.

Figure 7:
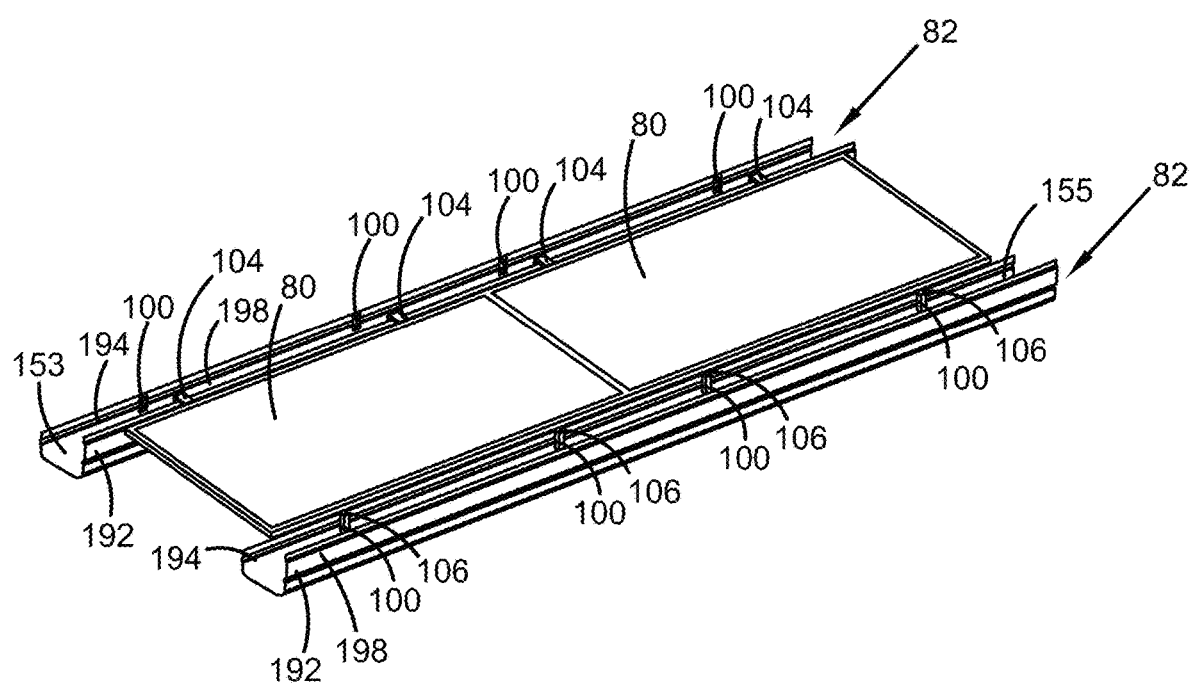
FIG. 7 is a top right perspective view of a solar array mounted with two gutter assemblies.

The mounting system includes gutter assemblies. A gutter assembly includes a gutter channel 152 (FIG. 1) and one or more bracket assemblies. The bracket assemblies include a bracket, and an extended clamp and/or a compact clamp coupled to a bracket. An example of solar panels 80 mounted using gutter assemblies 82 is depicted in FIG. 7. The solar panels 80, on one side, are coupled to extended clamps 104 of bracket assemblies 100 and to a first gutter channel 153. On an opposite side, the solar panels 80 are coupled to compact clamps 106, which are coupled to a second gutter channel 155. Reinforcing members of the extended clamps 104 allow the extended clamps 104 to be longer than the compact clamps 106, which can create a gap between the first gutter channel 153 and the solar panels 80 when the solar panels 80 are mounted. The bracket assemblies 100 fit within respective first and second gutter channels 153, 155, and the brackets generally reflect the shape of the respective first and second gutter channels 153, 155. The solar panels 80 are downwardly sloped in a direction from the first gutter channel 153 to the second gutter channel 155. This downward slope allows water (such as rainwater) or other liquids falling onto the solar panels 80 to be directed down the slope into the second gutter channel 155. The first and second gutter channels 153, 155 can be downwardly sloped along its length to direct the water in a chosen direction. The gutter assembly 82, itself can act as an electrical ground. For example, a grounding path can run between a solar panel frame, the clamps 104, 106, the brackets 102, and the gutter channels 152.

Figure 8:
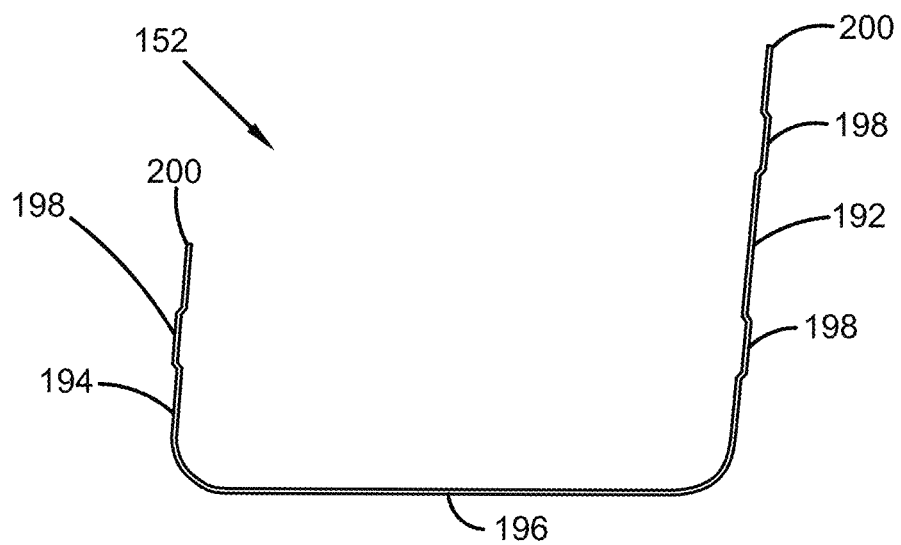
FIG. 8 is a cross-sectional view of a gutter channel.

A front view of the gutter channel 152 is shown in FIG. 8. The gutter channel 152 includes a long gutter wall 192 and a short gutter wall 194 extending from a gutter base wall 196. The gutter walls 192, 194, 196 can include ridges 198 that reinforce the strength of the gutter walls 192, 194, 196. The edges 200 of the long gutter wall 192 and the short gutter wall 194, can be a folded over to prevent sharp edges and/or to reinforce the strength of the edges 200. The gutter channels 152 can be roll-formed, such as via Roll-A-Rack™ portable roll-forming technology. Using portable roll-forming technology, the gutter channels 152 can be constructed onsite as-needed from a supply or roll of unformed gutter channel material. The roll of unformed gutter sheet material can be roll-formed and cut to length depending on the requirements of a particular application. The gutter channel material can be metal or any other suitable material. Alternatively or additionally, the gutter channel material can be completely recyclable.

Figure 9:
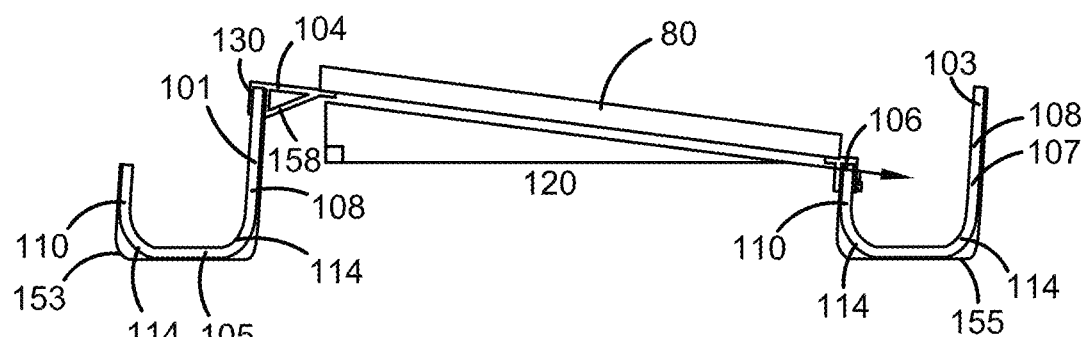
FIG. 9 is a front view of two bracket assemblies connected to a solar panel and mounted within two respective gutter channels.

Turning next to FIG. 9, a mounted solar panel 80 is shown. The solar panel 80 is coupled to an extended clamp 104 of a first bracket assembly 101 that is coupled to a first gutter channel 153. On the other side, the solar panel 80 is coupled to a compact clamp 106 of a second bracket assembly 103 which is coupled to a second gutter channel 155. Because the first bracket assembly 100 couples the solar panel 80 on one end to the long arm 108 of a first bracket 105 and to the short arm 110 of a second bracket 107, the solar panel 80 is downwardly sloped in a direction from the first gutter channel 153 to the second gutter channel 155. The downward slope 120 allows rainwater or other water or liquid falling onto the solar panel 80 to be directed down the slope 120 into the second gutter channel 155. The second gutter channel 155 is downwardly sloped along its length to direct the rainwater in a chosen direction. The reinforcing member 158 of the extended clamp 104 allows the extended clamp 104 to be longer than the compact clamp 106, creating a gap between the first gutter channel 153 and the solar panel 80. The bracket assemblies 101, 103 fit within respective gutter channels 153, 155, and the brackets 105, 107 generally reflect the shape of the respective gutter channels 153, 155.

FIGS. 10 and 11 depict further in detail the assembly process of a solar array 204 including a first solar panel 80 and a second solar panel 81 using first and second bracket assemblies 101, 103. A first bracket 105 is coupled to a solar panel 80 via an extended clamp 104 on one side of the solar panel 80, and on the other side the solar panel 80 is coupled to a compact clamp 106. A first bracket 105 is inserted into the first gutter channel 153. The compact clamp 106 is coupled to the second bracket 107, which may already be coupled to an extended clamp 104 coupled to a second solar panel 81 and inserted into and secured to a second gutter channel 155. The components, including the panel 80, the bracket assemblies 101, 103, and the gutter channels 153, 155 can be connected or coupled in any suitable sequence or order.

FIG. 11 depicts the solar array 204 of FIG. 10 after the first bracket 105 has been fully inserted into the gutter channel 153 and the compact clamp 106 has been coupled to the second bracket 107, the second bracket 107 already being coupled to the second gutter channel 155. As shown, both the solar panel 80 and the second solar panel 81 are sloped downwardly in the same direction. This downward slope directs rainwater that falls onto the solar panels 80, 81 to the side of the solar panels 80, 81 which are connected to their respective compact clamps 106, into the gutter channel that is downstream due to the downward slope. In FIG. 11, for example, rainwater falling upon the solar panel 80 would be directed down the slope 120 into the second gutter 155. Any number of solar panels 80, 81 can be selectively connected in this manner with gutter channels 153, 155 and bracket assemblies 101, 103 depending on the chosen solar panel array configuration.

Figure 12:
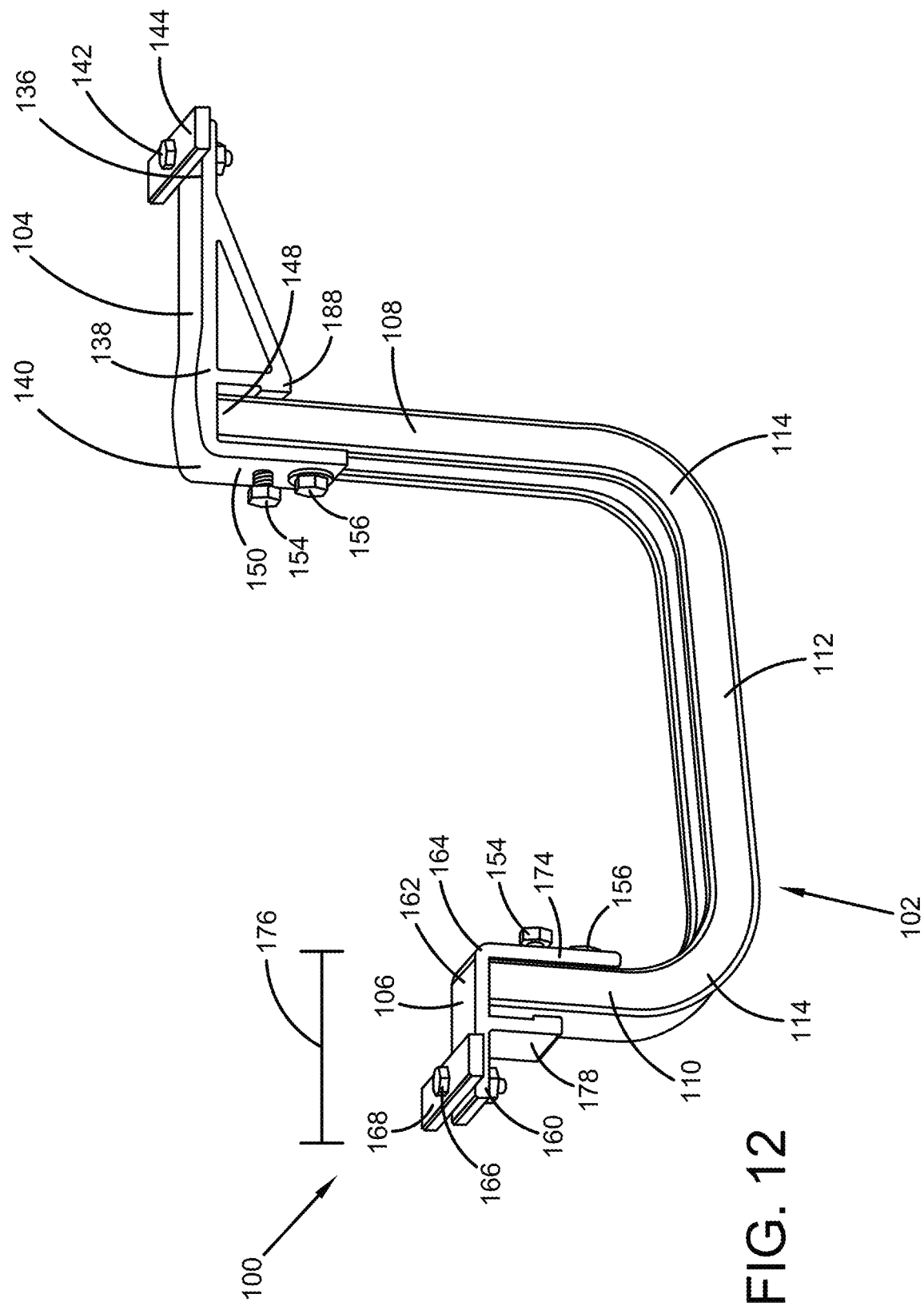
FIG. 12 is a front perspective view of an exemplary bracket assembly for mounting the solar array.

An example of a bracket assembly 100 is depicted in FIG. 12. The illustrated bracket assembly 100 includes a bracket 102, and the extended clamp 104 and the compact clamp 106 configured to be coupled to the bracket 102. The bracket includes a long bracket arm 108, and a short bracket arm 110 which is shorter relative to the long bracket arm 108. The extended clamp 104 can be connected to the long bracket arm 108 and the compact clamp 106 can be connected to the short bracket arm 110.

Bracket assemblies 100 which are between and coupled to two solar panels include both an extended clamp 104 and a compact clamp 106. Bracket assemblies 100 which are coupled to only one solar panel 80 (FIG. 1) can include either an extended clamp 104 or a compact clamp 106, depending on whether the side of the solar panel is to be coupled to the long arm 108 or the short arm 110 of the bracket 102. For example, a bracket assembly 100 or a row of bracket assemblies 100 can be connected only to one side of a panel 80 or row of panels 80 and a short wall 194 (FIG. 8) of a gutter channel 152 (FIG. 1). Therefore, the bracket assemblies 100 will only use compact clamps 106 to connect the panel(s) 80 to the gutter channel 152. Alternatively, a bracket assembly 100 or a row of bracket assemblies 100 can be connected to a side of a panel 80 or a row of panels 80 and a long side 192 of a gutter channel, in which case the bracket assemblies 100 will only use extended clamps 104 to connect the panel(s) 80 to the long side 192 (FIG. 8) of the gutter channel 152. When the bracket assemblies 100 are used to connect a gutter channel 152 to two different panel(s) 80, the bracket assemblies 100 will include both the extended clamp 104 and the compact clamp 106 to connect the sides of each panel 80 to its respective long or short side 192, 194 of the gutter channel 152. Any suitable combination of a brackets 112, and either an extended clamp 104, a compact clamp 106, or both an extended clamp 104 and a compact clamp 106 can be used in each bracket assembly 100 depending on the locations of the solar panels 80 in the array, the order of installation of the panels and the requirements for installation. The sequence or order in which each of the components of the bracket assembly 100 are installed to the mounting location or coupled to the solar panels 80, the gutter channels 152, or to each other can vary based on the requirements of the array configuration, available labor resources, installation limitations, and other considerations.

Figure 13:
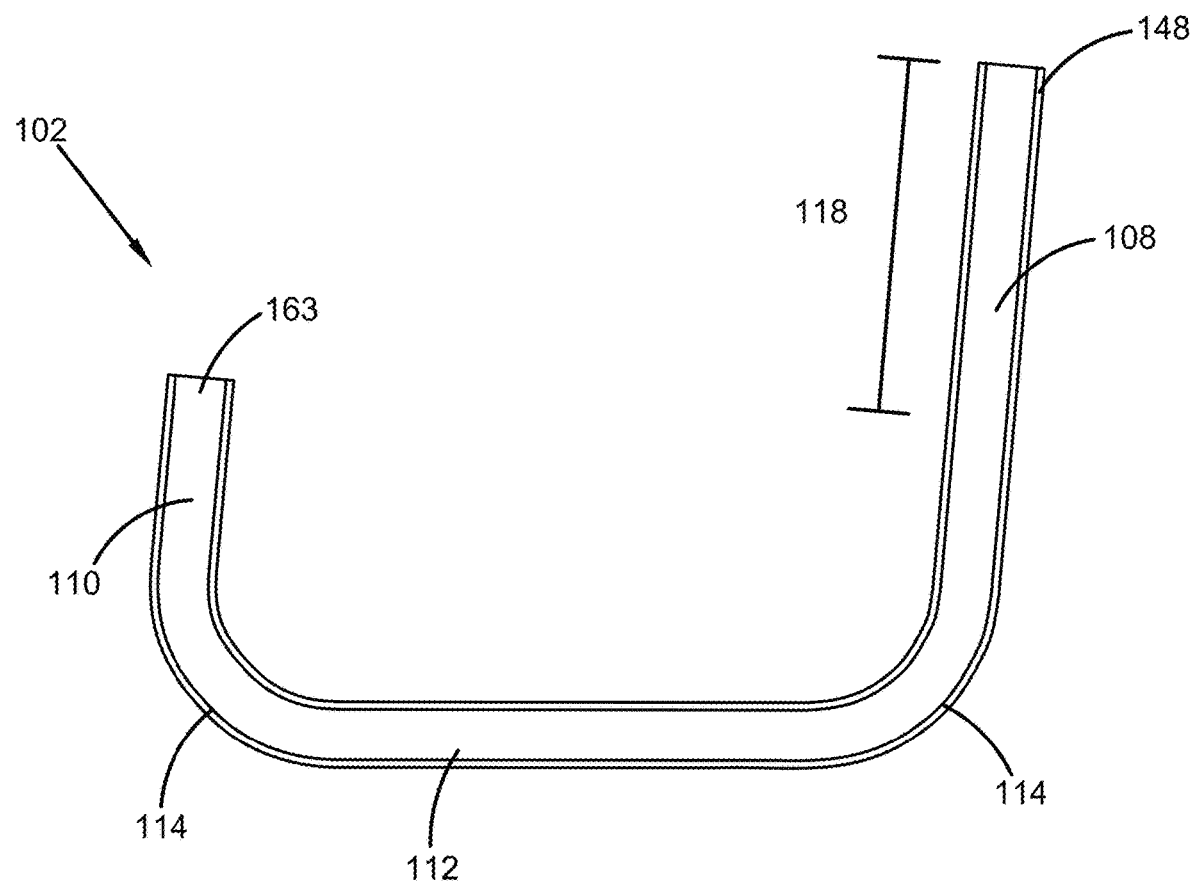
FIG. 13 is a front view of a bracket of the bracket assembly.

FIG. 13 depicts a bracket 102 of the bracket assembly 100. The bracket 102 can be extruded and bent into a desired shape. As shown, the bracket 102 has a shape similar to the letter "J," with a long bracket arm 108, a short bracket arm 110, a bottom bracket region 112, and curved bracket regions 114. The curved bracket regions 114 are between the long bracket arm 108 and the bottom bracket region 112, and the short bracket arm 110 and the bottom bracket region 112, respectively. When multiple of the bracket assemblies 100 are used and connected to a solar panel 80, the difference in length 118 between the long bracket arm 108 and the short bracket arm 110 can result in the solar panel 80 having a downward slope. The downward slope has the benefit of directing water (such as rainwater) or other liquids that fall upon the solar panel 80 in the direction of the downward slope.

Figure 14:
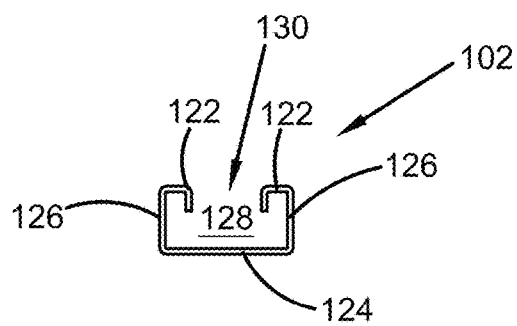
FIG. 14 is a side cross-sectional view of the bracket of the bracket assembly.

A cross-section of the bracket 102, shown in FIG. 14, can have a shape similar to a U-shape with curved edges 122. The bracket has a back side 124, that can be substantially flat and run along the entire outside of the bracket 102. Extending from the back side 124 are bracket side walls 126 having curved edges 122. The back side 124 and the side walls 126 of the bracket 102 define a hollow bracket region 128 with an opening 130, into which central legs of the extended and compact clamps 104, 106, can be inserted. The insertion of the central legs into the hollow region 128 allows the extended and compact clamps 104, 106 to be secured and/or fastened to the bracket 102.

The bracket 102 can be extruded and then bent or formed into shape or otherwise made by any other suitable method. The bracket 102 can be made of any suitable material such as metal, plastic, or composite. Alternatively or additionally, the bracket 102 can be made of completely recyclable materials.

Turning next to FIGS. 15 and 16, FIG. 15 depicts details of the extended clamp 104, and FIG. 16 depicts details of the compact clamp 106. The extended clamp 104 has a front portion 136, an intermediate portion 138, and a back portion 140. The front portion 136 is connectable to a solar panel 80 (FIG. 1), such as via an extended clamp plate-bolt 141. The plate-bolt 141 includes a bolt 142 threaded into or otherwise fixed to a plate 144. A nut 216 can be used to connect the plate-bolt 141 to the panel 80.

The intermediate portion 138 includes the extended clamp central leg 132, which is configured to be inserted into the hollow region 128 on an end 148 (FIG. 3) of the long bracket arm 108. The back portion 140 includes an extended clamp back leg 150 through which a gutter channel and the bracket 102 can be fastened to the extended clamp 104. The extended clamp 104 can be fastened to the bracket 102 and the gutter channel 152 (FIG. 1) using bolts, or by any other suitable fastening means. The extended clamp 104 can include a reinforcing member 158 that extends between the intermediate region 138 and the front region 136.

FIG. 16 depicts the compact clamp, which functions similarly to the extended clamp. The compact clamp 106 has a compact clamp front portion 160, a compact clamp intermediate portion 162, and a compact clamp back portion 164. The front portion 160 is connectable to a solar panel 80 (FIG. 1), such as via a compact clamp plate-bolt 161. The plate-bolt 161 includes a bolt 166 threaded into or otherwise fixed to a plate 168. A nut 222 can be used to connect the plate-bolt 161 to the panel 80.

The intermediate portion 162 includes the compact clamp central leg 134 which is configured to be inserted into the hollow region 128 on an end 163 of the short bracket arm 172. The back portion 164 includes a back leg 174 through which a gutter channel 152 (FIG. 1) and the bracket 102 can be fastened to the compact clamp 106. The compact clamp 106 can be fastened to the bracket 102 and the gutter channel 152 using bolts or by any other suitable fastening means. The compact clamp 106 can vary from the extended clamp 104 in that it is shorter along a dimension 176 extending between the back portion 164 and the front portion 160. Because of this shorter dimension, in the exemplary compact clamp 106 shown in FIG. 16, a reinforcing member such as the reinforcing member 158 of FIG. 15 may or may not be used to reinforce the compact clamp 106.

Figure 17:
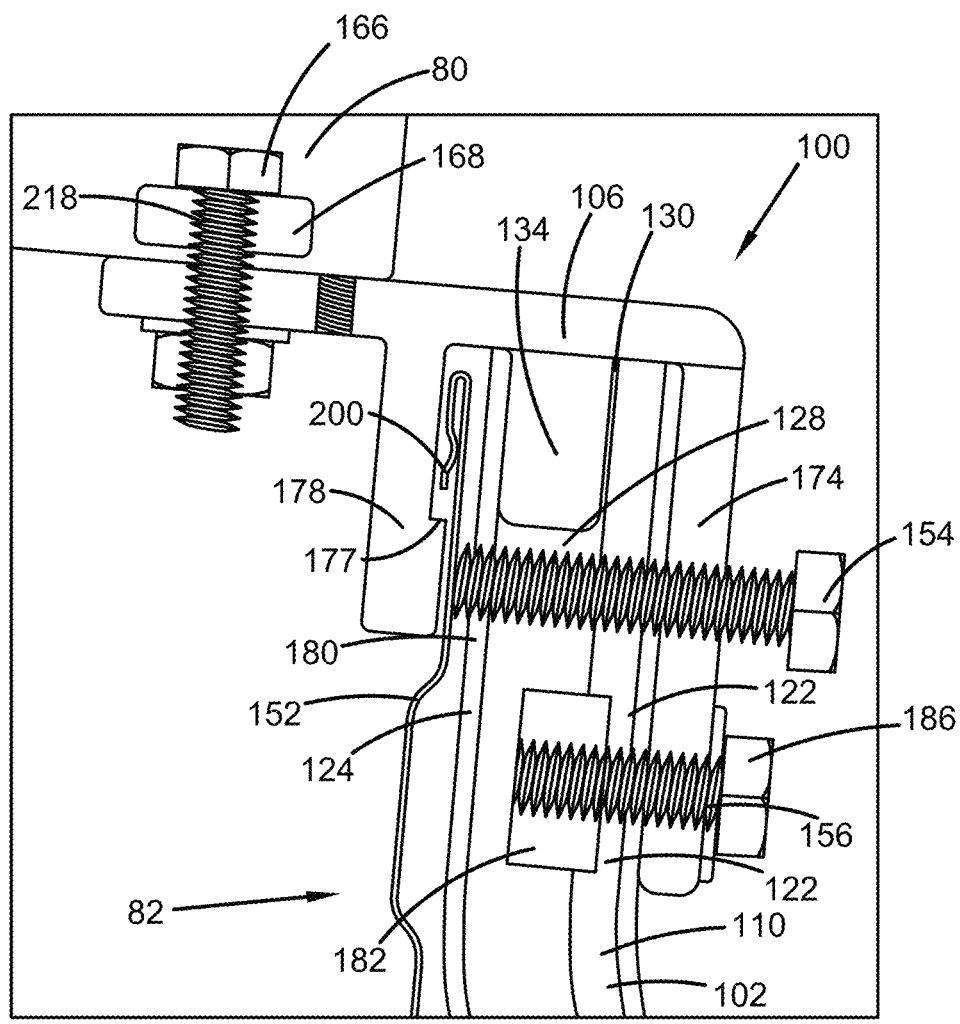
FIG. 17 is a front cross-sectional view of the compact clamp side of the bracket assembly connected to a gutter channel and a solar panel.

FIG. 17 illustrates how the central leg 134 of the compact clamp 106 fits within the hollow region 128 while the compact clamp 106 couples the solar panel 80 to the bracket 102. A front leg 178 of the compact clamp 106 is located in the intermediate region 162 (FIG. 16) of the compact clamp 106. The first bolt 154 can press or pinch a gutter channel 152 against the front leg 178, securing the gutter channel 152 to the compact clamp 106. The bracket 102 includes a bracket slot 180, which may be a hole, slot, or opening, for the first bolt 154 to pass through from inside of the bracket 102 to the outside of the bracket 102. As shown, the central leg 134 fits within the hollow region 128 and does not make contact with the bolt 154 securing the gutter channel 152 to the front leg 178.

A compact clamp bolt 156 with a cooperating plate 182 is used to couple the compact clamp 106 to the bracket 102. The cooperating plate 182 can be placed within the hollow region 128. The compact clamp bolt 156 tightens the cooperating plate 182 against an interior surface near the curved edges 122 of the bracket 102, securing the compact clamp 106 to the bracket 102. The compact clamp bolt 156 may be shorter than the first bolt 154 so that the nut 186 of the compact clamp bolt 156 does not excessively protrude outwardly away from the back leg 174 of the compact clamp 106. The gutter channel 152 fits within a hollow region 179 between the front leg 178 and the bracket 102. Prior to securing the compact clamp 106 to the gutter channel, the location of compact clamp 106 can be adjusted by sliding the clamp along the length of the gutter channel 152.

When the gutter channel 152 is coupled to the compact clamp 106, a lip 177 on the front leg 178 engages with the folded edge 200 of the gutter channel 152. The folded lip 200 stops the compact clamp 177 from lifting out of the hollow region 128 of the bracket arm 102, for example, when wind blows beneath the solar panels 80 and presses upwardly on the solar panels 80. The engagement of the lip 177 on the front leg 178 with the folded lip 200 on the gutter channel, therefore, prevents the solar panels 80 from being removed, uplifted, or dislocated from the mounting system by wind forces, for example. To further prevent wind forces from moving the solar array 80, weights such as bricks, rocks, or blocks can be placed within the gutter channels 152 before, during, or after coupling of the gutter channels 152 to the solar panels 80.

Figure 18:
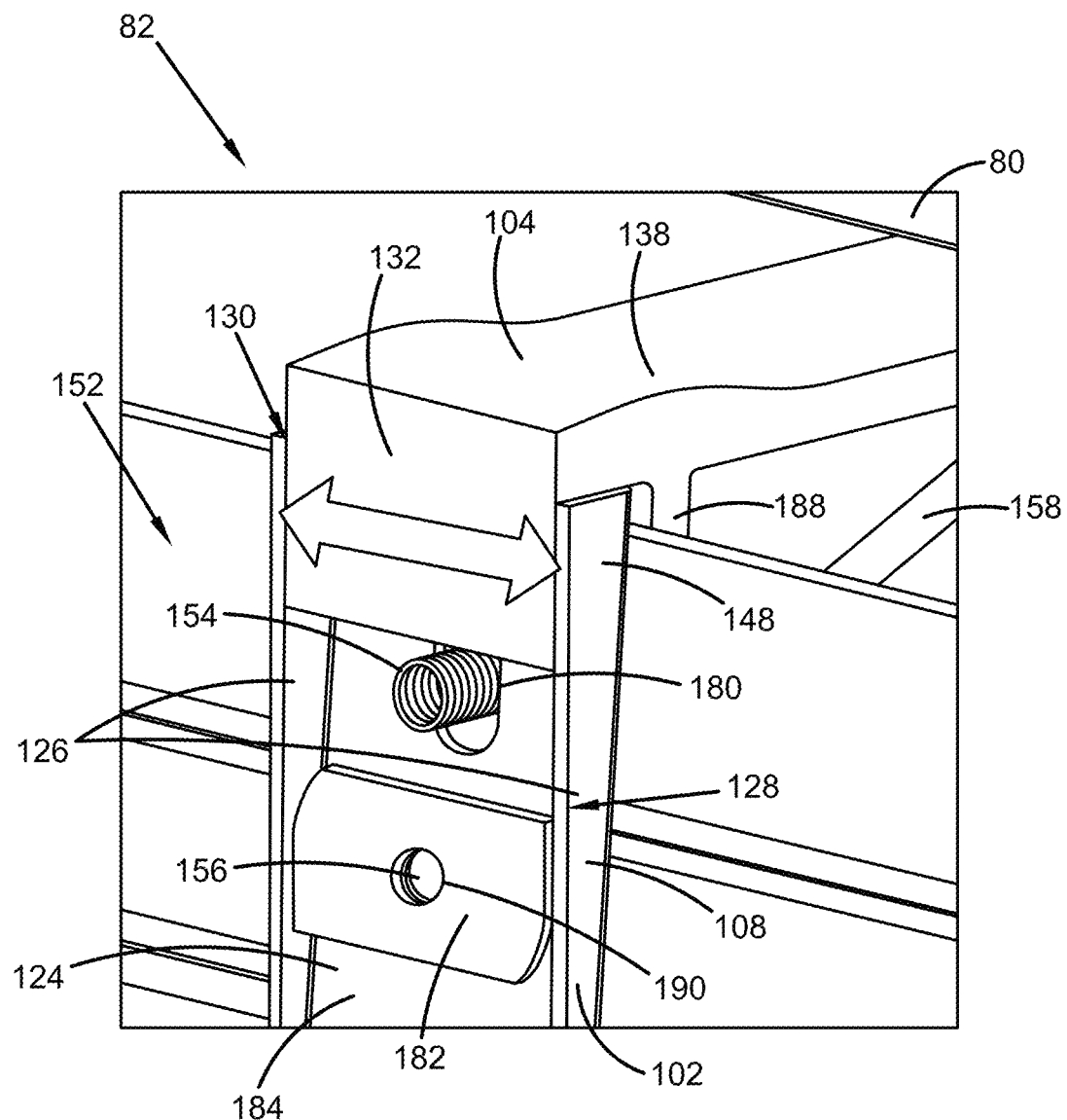
FIG. 18 is a cross-sectional perspective view of the bracket assembly of FIG. 17.

FIG. 18 depicts a cutaway of the central leg 132 of the extended clamp 104 when the extended clamp 104 is coupled to the bracket 102 and the gutter channel 152. As shown, the gutter channel 152 fits between the central leg 132 and an extended clamp front leg 188. The central leg 132 fits within the hollow region 128 in the bracket 102 defined by the back wall 124 and the side walls 126. The central leg 132 is of a length that is not long enough to interfere with the extended clamp bolt 154 extending through the slot 180 in the bracket 102. The cooperating plate 182 is placed in the hollow region 128 and includes a cooperating plate hole 190 for the compact clamp bolt 156 to pass through to secure the extended clamp 104 to the bracket 102. The gap between the front leg 188 and the central leg 132 is wide enough to accommodate any ridges or geometries present on a wall of the gutter channel 152.

Figure 19:
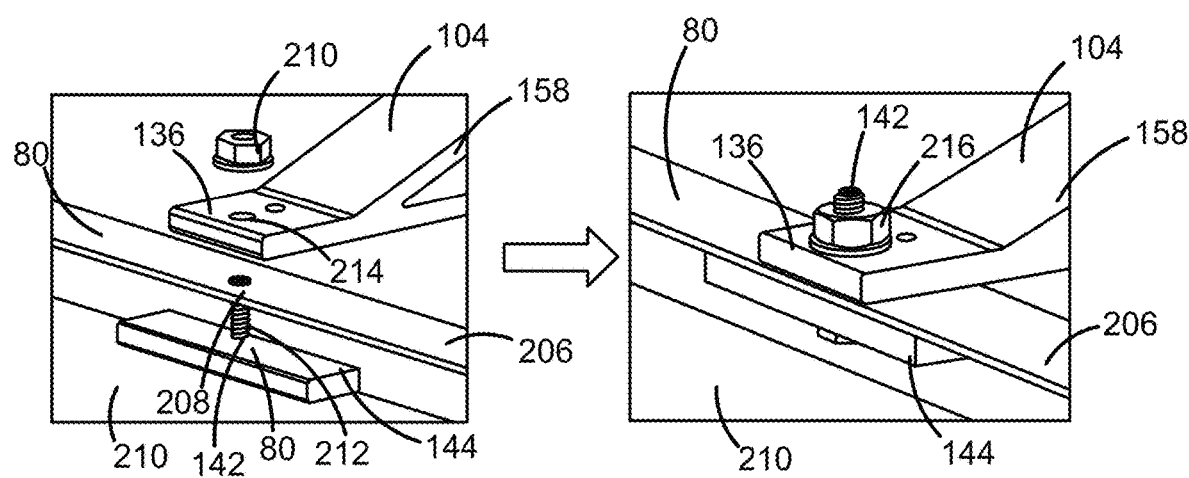
FIG. 19 is a perspective view of the front portion of an extended clamp being connected to a solar panel flange via bolts and an extended clamp plate.

FIG. 19 illustrates the connection between the extended clamp 104 and a solar panel 80. The solar panel 80 can include a flange 206 at the end of the solar panel 80, containing a hole, slot, or other opening 208. The extended clamp plate 144 can be placed against a portion of the flange 206 facing a main body 210 of the solar panel 80. A plate-bolt 141 can be placed through the flange hole 208 and through a hole or opening 214 on the front end 136 of the extended clamp 104. A nut 216 can be used to secure the solar panel 80 to the extended clamp 104 via the plate bolt 141. As previously mentioned, the plate-bolt 141 does not need to be secured by a tool while the nut 216 is being threaded onto the plate-bolt 141. Instead, contact between the plate-bolt 141 and the solar panel flange 206 prevents rotation of the plate-bolt 141 while the nut 216 is rotated and tightened. Alternatively or additionally, any other suitable fastening means can be used to couple the solar panel 80 and the extended clamp 104.

Figure 20:
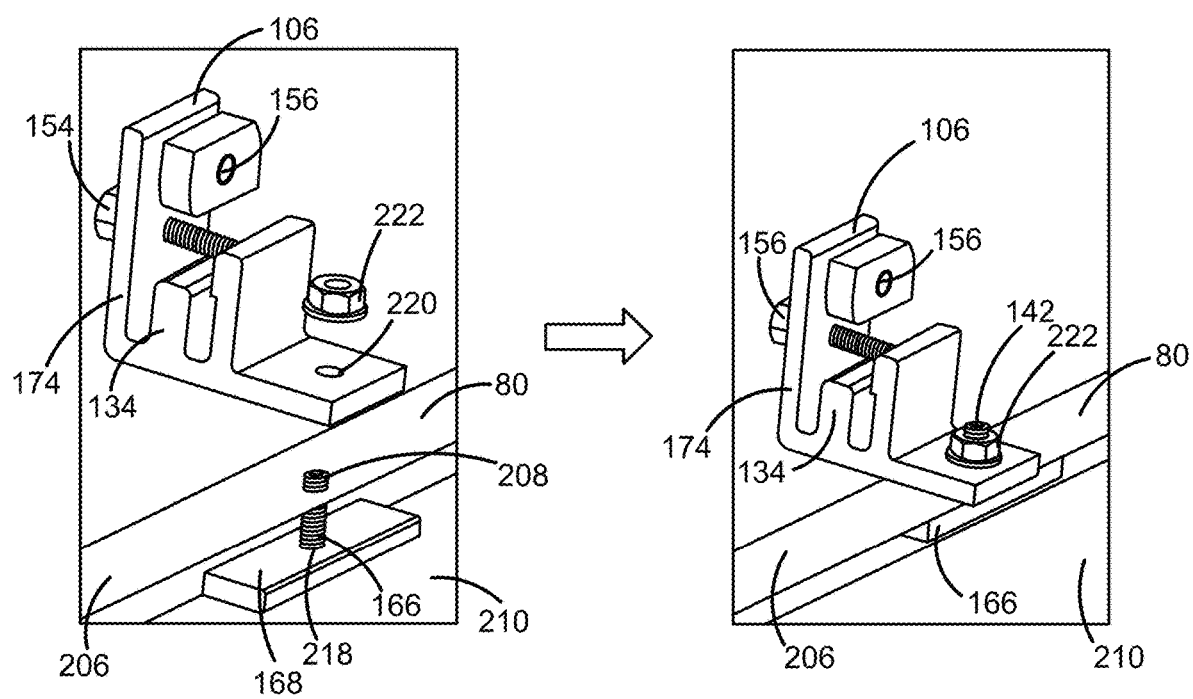
FIG. 20 is a perspective view of a compact clamp being connected to a solar panel flange via bolts and a second plate.

FIG. 20 illustrates the connection between the compact clamp 106 and the solar panel 80. The connection between the compact clamp 106 and the solar panel 80 operates similarly to the connection between the extended clamp 104 and the solar panel 80. The second plate 168 can be placed against the portion of the flange 206 facing the main body 210 of the solar panel 80. A compact plate-bolt 161 can be placed through the flange hole 208 and through a hole or opening 220 on the front end 160 of the compact clamp 106. A nut 222 can be used to secure the solar panel 80 to the compact clamp 106 via the compact plate-bolt 161. The plate-bolt 161 does not need to be secured by a tool while the nut 222 is being threaded onto the plate-bolt 161. Instead, contact between the plate-bolt 161 and the solar panel flange 206 prevents rotation of the plate-bolt 161 while the nut 222 is rotated and tightened. Alternatively or additionally, any other suitable fastening means can be used to couple the solar panel 80 and the compact clamp 106.

Figure 21:
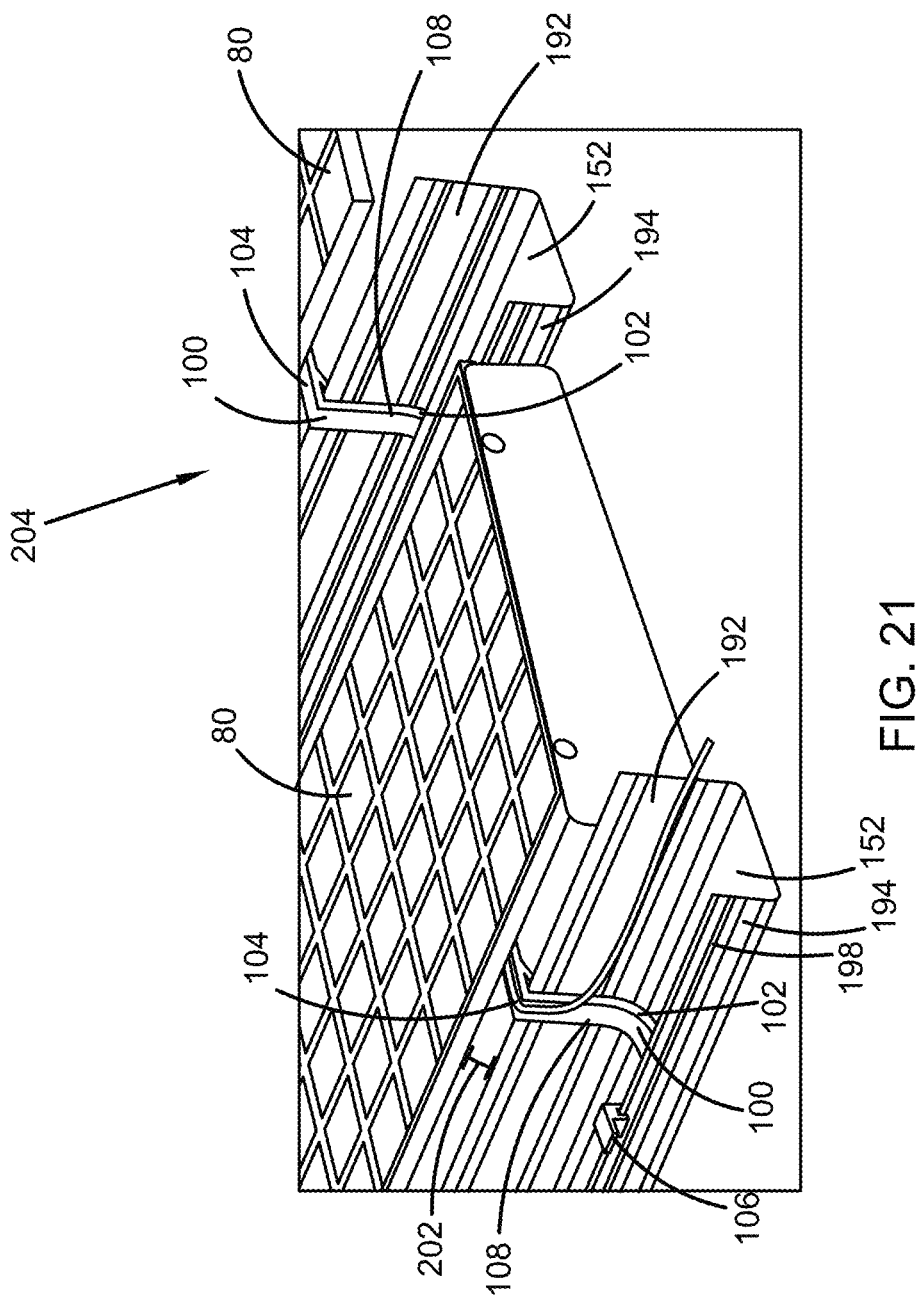
FIG. 21 is a front left perspective view of a portion of a solar panel array mounted with multiple ones of the bracket assembly.

FIG. 21 shows a front left perspective view of a solar array 204. When the solar panels 80 are mounted using the bracket assemblies 100 coupled to the gutter channels 152, the panels 80 are downwardly sloped. On the respective side of each respective panel 80 coupled to each respective extended clamp 104, there is a gap 202 between the edge of each respective panel 80 and its coupled gutter channel 152. The downward slope of the panels 80 allows rainwater to flow from the side of the panel connected to the extended clamp 104 to the side of the panel connected to the compact clamp 106 and then into the gutter channel 152 connected into the compact clamp 106.

Figure 22:
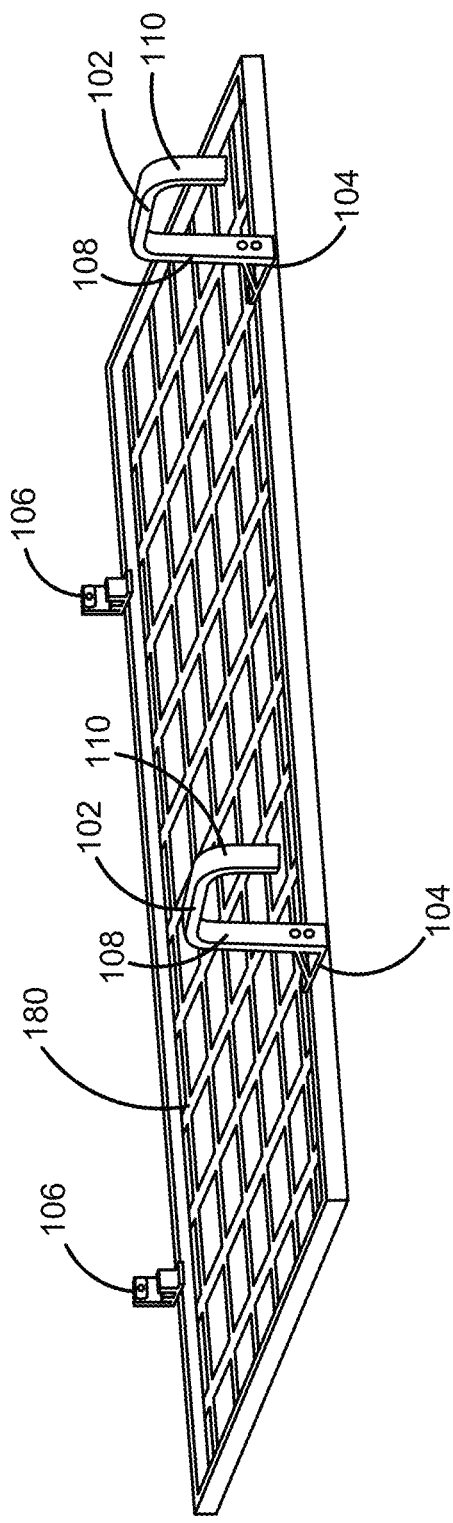
FIG. 22 is a bottom perspective view of a solar panel with bracket assembly components during the bracket assembly-to-solar panel attachment process.
Figure 23:
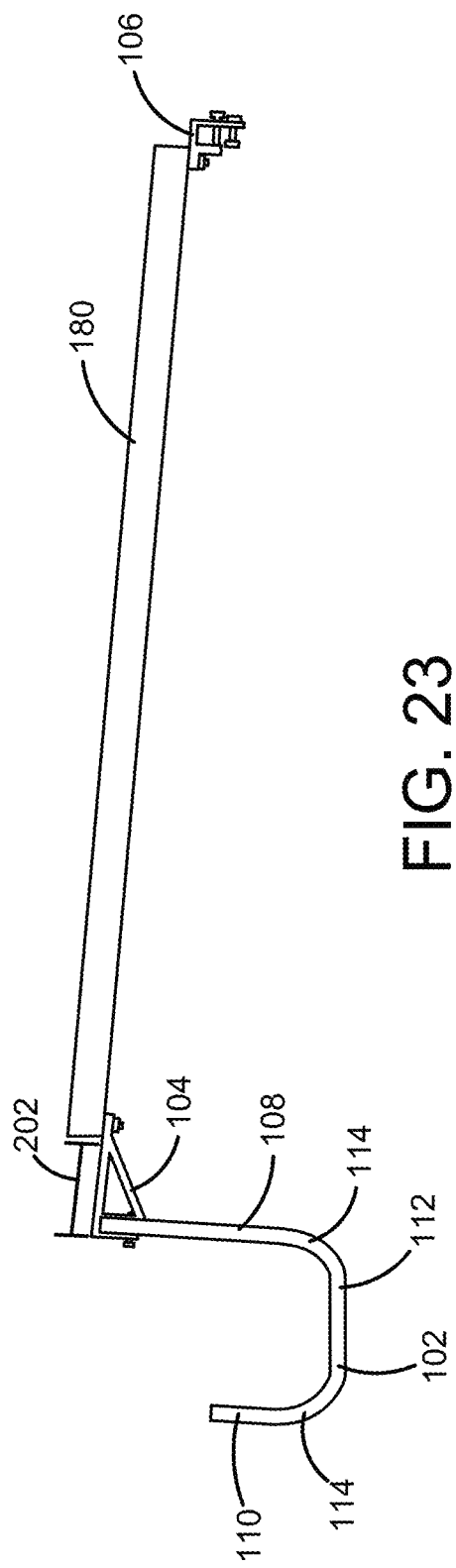
FIG. 23 is a front view of the solar panel and bracket assembly components of FIG. 22.

FIG. 22 illustrates the coupling of bracket assemblies 100 with extended and compact clamps 104, 106, prior to mounting of the solar panel 80 within a solar array. The extended and compact clamps 104, 106 can be placed along the edges of the solar panel 80 at designated locations along the flange 206 near the back side of the solar panel 80. FIG. 23 is a front view of the coupled solar panel 80 of FIG. 22 prior to installation into gutter channels.

Figure 24:
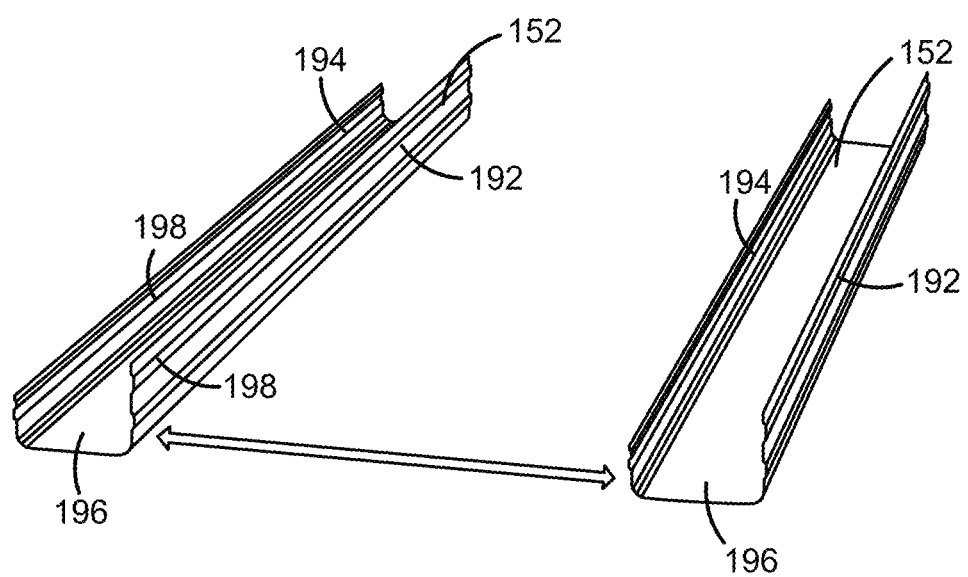
FIG. 24 is a top perspective view of gutter channels.

FIG. 24 illustrates gutter channels 152 laid parallel to each other prior to coupling of the gutter channels 152 with the bracket assemblies 100. The distance between the gutter channels 152 can generally correspond to the width of the solar panels 80 (FIG. 7) and the gap 202 (FIG. 21), and can also account for the slope 120 (FIG. 11) of the installed solar panels 80 (FIG. 1).

A method of assembling a solar array includes: roll-forming a first length of gutter material into a first gutter channel 153 (FIG. 9); roll-forming a second length of gutter material into a second gutter channel 155 (FIG. 9); arranging a solar panel 80 (FIG. 9) between the first gutter channel 153 and the second gutter channel 155; connecting a first bracket assembly 101 (FIG. 9) to the solar panel 80 and to a first gutter channel short side; connecting a second bracket assembly 103 (FIG. 9) to the solar panel and to a second gutter channel long side; downwardly sloping the solar panel 80 in a solar panel slope direction; downwardly sloping the first gutter channel 153 along the first gutter channel longitudinal length in a chosen direction; and downwardly sloping the second gutter channel 155 along the second gutter channel longitudinal length in the chosen direction.

A bracket assembly 100 for coupling a solar panel array to a gutter channel 152 includes a bracket 102, an extended clamp 104, and a compact clamp 106. The bracket 102 has a long bracket arm 108 and a short bracket arm 110, the long bracket arm 108 being longer than the short bracket arm 110. Each of the long bracket arm 108 and the short bracket arm 110 extend from a bottom bracket portion 112. The extended clamp 104 is connectable to the long bracket arm 108, a first solar panel 120 of the solar panel array, and the gutter channel 152. The gutter channel 152 has a long gutter channel wall 192 which is longer relative to a short gutter channel wall 194, each of the long gutter wall 192 and the short gutter wall 194 extend from a gutter channel base wall 196. The compact clamp 106 is connectable to the short bracket arm 110, a second solar panel 80 of the solar panel array, and the gutter channel 152.

All features disclosed herein, including the claims, abstract, and drawings, and all the steps in any method or process disclosed, may be combined in any combination, except combinations where at least some of such features and/or steps are mutually exclusive. Each feature disclosed herein, including the claims, abstract, and drawings, can be replaced by alternative features serving the same, equivalent, or similar purpose, unless expressly stated otherwise.

Although the invention defined by the following claims has been shown and described with respect to a certain embodiment, equivalent alternations and modifications will occur to others skilled in the art upon reading and understanding this specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function of the described integer (i.e., that is functionally equivalent), even though not structurally equivalent to the disclosed structure which performs the function in the herein illustrated exemplary embodiments of the invention. In addition, while a particular feature of the invention may have been described above with respect to only one of several illustrated embodiments, such feature may be combined with one or more other features of the other embodiments, as may be desired and advantageous for any given or particular application.

I claim:

1. A method of assembling a solar array comprising roll-forming a first length of gutter material into a first gutter channel such that the first gutter channel has a first gutter channel long side, a first gutter channel short side, and a first gutter channel longitudinal length, the first gutter channel long side being longer than the first gutter channel short side;

roll-forming a second length of gutter material into a second gutter channel such that the second gutter channel has a second gutter channel long side, a second gutter channel short side, and a second gutter channel longitudinal length, the second gutter channel long side being longer than the second gutter channel short side;

arranging a solar panel between the first gutter channel and the second gutter channel;

connecting a first bracket assembly to the solar panel and to the first gutter channel short side;

connecting a second bracket assembly to the solar panel and to the second gutter channel long side;

downwardly sloping the solar panel in a solar panel slope direction;

downwardly sloping the first gutter channel along the first gutter channel longitudinal length in a chosen direction; and downwardly sloping the second gutter channel along the second gutter channel longitudinal length in the chosen direction;

wherein the chosen direction of the first gutter channel and the chosen direction of the second gutter channel transverses the direction of the downward slope of the solar panel slope direction; and wherein the first gutter channel and second gutter channel are parallel and are not contiguous.

2. The method according to claim 1, further comprising downwardly sloping the solar panel, the first gutter channel, and/or the second gutter channel toward a bioswale.

3. The method according to claim 1, further comprising downwardly sloping the solar panel, the first gutter channel, and/or the second gutter channel toward a pollinator habitat.

4. The method according to claim 1, further comprising downwardly sloping the solar panel, the first gutter channel, and/or the second gutter channel toward a body of water.

5. The method according to claim 1, further comprising connecting two or more solar panels in a row in series to produce a block of panels.

6. The method according to claim 5, further comprising coupling two or more blocks of panels.

7. The method according to claim 5, further comprising connecting ten solar panels in a row in series to produce a block of ten panels.

8. The method according to claim 7, further comprising coupling two or more blocks of panels.

9. The method according to claim 1, further comprising substantially perpendicularly connecting an additional gutter channel to one or more ends of the first gutter channel and the second gutter channel;

wherein the additional gutter channel is configured to direct rainfall in a direction substantially perpendicular to the chosen direction.

\* \* \* \* \*